(12) United States Patent
Hannigan et al.

(10) Patent No.: US 8,213,674 B2
(45) Date of Patent: *Jul. 3, 2012

(54) PERCEPTUAL MODELING OF MEDIA SIGNALS FOR DATA HIDING

(75) Inventors: Brett T. Hannigan, Philadelphia, PA (US); Alastair M. Reed, Lake Oswego, OR (US); Brett A. Bradley, Portland, OR (US)

(73) Assignee: Digimarc Corporation, Beaverton, OR (US)

(*) Notice: Subject to any disclaimer, the term of this patent is extended or adjusted under 35 U.S.C. 154(b) by 0 days.

This patent is subject to a terminal disclaimer.

(21) Appl. No.: 12/912,471

(22) Filed: Oct. 26, 2010

(65) Prior Publication Data

US 2011/0150268 A1 Jun. 23, 2011

Related U.S. Application Data

(63) Continuation of application No. 12/360,549, filed on Jan. 27, 2009, now Pat. No. 7,822,226, which is a continuation of application No. 11/498,528, filed on Aug. 2, 2006, now Pat. No. 7,483,547, which is a continuation of application No. 10/684,213, filed on Oct. 10, 2003, now Pat. No. 7,088,844, which is a continuation of application No. 09/737,609, filed on Dec. 13, 2000, now Pat. No. 6,633,654, which is a continuation-in-part of application No. 09/596,658, filed on Jun. 19, 2000, now Pat. No. 6,631,198.

(51) Int. Cl.
*G06K 9/00* (2006.01)
*H04N 11/02* (2006.01)

(52) U.S. Cl. .................... 382/100; 375/240.26

(58) Field of Classification Search ............... 382/100, 382/232, 240; 370/522–527; 283/72, 74–81, 283/85, 93, 113, 901; 713/176, 179; 358/3.28; 380/51, 54, 210, 252, 287; 375/240.26, 270, 375/277, 301, 321; 725/9, 20, 22

See application file for complete search history.

(56) References Cited

U.S. PATENT DOCUMENTS

| | | | |
|---|---|---|---|
| 4,238,849 A | 12/1980 | Gassmann |
| 4,379,947 A | 4/1983 | Warner |
| 4,395,600 A | 7/1983 | Lundy et al. |
| 4,425,642 A | 1/1984 | Moses et al. |
| 4,750,173 A | 6/1988 | Bluthgen |
| 5,083,224 A | 1/1992 | Hoogendoorn et al. |
| 5,319,735 A | 6/1994 | Preuss et al. |

(Continued)

FOREIGN PATENT DOCUMENTS

EP 493091 7/1992

(Continued)

OTHER PUBLICATIONS

U.S. Appl. No. 60/286,239, filed Apr. 24, 2001, Kim.
Autrusseau et al., "A Psychovisual Approach for Watermarking", Proceedings of SPIE vol. 4314, 2001, pp. 495-504.
Bartens, "Contrast Sensitivity for the Human Eye and its Effects on Image Quality," pp. 147-151, SPIE Press, 1999.
Bender, "Applications for Data Hiding," IBM Systems Journal, vol. 39, Nos. 384, 2000, pp. 547-568.

(Continued)

*Primary Examiner* — Abolfazl Tabatabai

(57) ABSTRACT

The present disclosure relates generally to embedding auxiliary data and data hiding. One claim recites a method including: receiving data representing a media signal; using a programmed electronic processor, calculating perceptibility characteristics of the media signal, in which the perceptibility characteristics include contrast; using a programmed electronic processor, calculating a non-linear contrast to gain mapping using the perceptibility characteristics; using a programmed electronic processor, embedding an auxiliary signal in the media signal with reference to the non-linear contrast to gain mapping. Other claims and combinations are also provided.

21 Claims, 6 Drawing Sheets

U.S. PATENT DOCUMENTS

| | | | |
|---|---|---|---|
| 5,537,223 A | 7/1996 | Curry | |
| 5,568,570 A | 10/1996 | Rabbani | |
| 5,579,124 A | 11/1996 | Aijala et al. | |
| 5,636,292 A | 6/1997 | Rhoads | |
| 5,646,997 A | 7/1997 | Barton | |
| 5,652,626 A | 7/1997 | Kawakami et al. | |
| 5,659,726 A | 8/1997 | Sandford, II et al. | |
| 5,663,766 A | 9/1997 | Sizer, II | |
| 5,719,966 A | 2/1998 | Brill et al. | |
| 5,721,788 A | 2/1998 | Powell et al. | |
| 5,721,805 A | 2/1998 | Cook et al. | |
| 5,721,809 A | 2/1998 | Park | |
| 5,721,818 A | 2/1998 | Hanif et al. | |
| 5,721,836 A | 2/1998 | Scharnberg et al. | |
| 5,721,838 A | 2/1998 | Takahashi et al. | |
| 5,745,604 A | 4/1998 | Rhoads | |
| 5,748,763 A | 5/1998 | Rhoads | |
| 5,774,452 A | 6/1998 | Wolosewicz | |
| 5,822,360 A | 10/1998 | Lee et al. | |
| 5,848,155 A | 12/1998 | Cox | |
| 5,850,481 A | 12/1998 | Rhoads | |
| 5,857,038 A | 1/1999 | Owada et al. | |
| 5,859,920 A * | 1/1999 | Daly et al. | 382/115 |
| 5,862,260 A | 1/1999 | Rhoads | |
| 5,901,178 A | 5/1999 | Lee et al. | |
| 5,905,800 A * | 5/1999 | Moskowitz et al. | 380/28 |
| 5,905,819 A | 5/1999 | Daly | |
| 5,915,027 A * | 6/1999 | Cox et al. | 380/54 |
| 5,960,081 A * | 9/1999 | Vynne et al. | 713/176 |
| 6,031,914 A | 2/2000 | Tewfik et al. | |
| 6,061,793 A | 5/2000 | Tewfik et al. | |
| 6,094,228 A | 7/2000 | Chiardullo et al. | |
| 6,130,741 A | 10/2000 | Wen et al. | |
| 6,181,802 B1 | 1/2001 | Todd | |
| 6,181,813 B1 | 1/2001 | Fan et al. | |
| 6,185,312 B1 | 2/2001 | Nakamura et al. | |
| 6,222,932 B1 | 4/2001 | Rao et al. | |
| 6,226,387 B1 | 5/2001 | Tewfik et al. | |
| 6,233,347 B1 | 5/2001 | Chen et al. | |
| 6,246,777 B1 | 6/2001 | Agarwal et al. | |
| 6,249,870 B1 | 6/2001 | Kobayashi et al. | |
| 6,278,792 B1 | 8/2001 | Cox et al. | |
| 6,282,299 B1 * | 8/2001 | Tewfik et al. | 382/100 |
| 6,282,300 B1 | 8/2001 | Bloom et al. | |
| 6,285,774 B1 | 9/2001 | Schumann et al. | |
| 6,314,192 B1 | 11/2001 | Chen et al. | |
| 6,332,030 B1 | 12/2001 | Manjunath et al. | |
| 6,334,187 B1 | 12/2001 | Kadono | |
| 6,385,329 B1 | 5/2002 | Sharma et al. | |
| 6,400,827 B1 | 6/2002 | Rhoads | |
| 6,411,392 B1 | 6/2002 | Bender et al. | |
| 6,442,284 B1 | 8/2002 | Gustafson et al. | |
| 6,477,431 B1 | 11/2002 | Kalker et al. | |
| 6,512,836 B1 | 1/2003 | Xie et al. | |
| 6,512,837 B1 * | 1/2003 | Ahmed | 382/100 |
| 6,519,350 B1 | 2/2003 | Van Overveld et al. | |
| 6,571,144 B1 | 5/2003 | Moses et al. | |
| 6,577,744 B1 | 6/2003 | Braudaway et al. | |
| 6,584,210 B1 | 6/2003 | Taguchi et al. | |
| 6,614,914 B1 * | 9/2003 | Rhoads et al. | 382/100 |
| 6,631,198 B1 | 10/2003 | Hannigan et al. | |
| 6,633,654 B2 | 10/2003 | Hannigan et al. | |
| 6,661,905 B1 | 12/2003 | Chupp et al. | |
| 6,707,930 B2 | 3/2004 | Kalker et al. | |
| 6,714,683 B1 | 3/2004 | Tian et al. | |
| 6,724,911 B1 * | 4/2004 | Cox et al. | 382/100 |
| 6,768,980 B1 | 7/2004 | Meyer et al. | |
| 6,792,129 B1 | 9/2004 | Zeng et al. | |
| 6,901,514 B1 | 5/2005 | Lu et al. | |
| 6,959,098 B1 | 10/2005 | Alattar | |
| 7,013,021 B2 | 3/2006 | Sharma et al. | |
| 7,088,844 B2 | 8/2006 | Hannigan et al. | |
| 7,151,854 B2 | 12/2006 | Shen et al. | |
| 7,483,547 B2 | 1/2009 | Hannigan et al. | |
| 7,519,819 B2 | 4/2009 | Bradley et al. | |
| 7,628,320 B2 | 12/2009 | Rhoads | |
| 7,684,623 B2 | 3/2010 | Shen et al. | |
| 7,822,226 B2 | 10/2010 | Hannigan et al. | |
| 2001/0016049 A1 | 8/2001 | Nguyen | |
| 2001/0026616 A1 | 10/2001 | Tanaka | |
| 2001/0028715 A1 | 10/2001 | Watanabe | |
| 2001/0028728 A1 | 10/2001 | Watanabe | |
| 2001/0030759 A1 | 10/2001 | Hayashi et al. | |
| 2001/0030761 A1 | 10/2001 | Ideyama | |
| 2001/0031064 A1 | 10/2001 | Donescu et al. | |
| 2001/0049788 A1 | 12/2001 | Shur | |
| 2001/0054145 A1 | 12/2001 | Shimada | |
| 2002/0013681 A1 | 1/2002 | Oostveen et al. | |
| 2002/0021824 A1 | 2/2002 | Reed et al. | |
| 2002/0054325 A1 | 5/2002 | Nishio et al. | |
| 2002/0054356 A1 | 5/2002 | Kurita et al. | |
| 2002/0057823 A1 | 5/2002 | Sharma et al. | |
| 2002/0085736 A1 | 7/2002 | Kalker et al. | |
| 2002/0097892 A1 | 7/2002 | Oami et al. | |
| 2002/0164048 A1 | 11/2002 | Bruckstein et al. | |
| 2002/0191812 A1 | 12/2002 | Kim | |
| 2003/0039376 A1 | 2/2003 | Stach | |
| 2003/0068068 A1 | 4/2003 | Kim et al. | |
| 2003/0091213 A1 | 5/2003 | Yamakage et al. | |
| 2005/0065780 A1 | 3/2005 | Wiser et al. | |
| 2006/0047704 A1 | 3/2006 | Gopalakrishnan | |

FOREIGN PATENT DOCUMENTS

| | | |
|---|---|---|
| EP | 1039414 | 9/2000 |
| EP | 1120741 | 8/2001 |
| EP | 1132895 | 9/2001 |
| EP | 1202250 | 5/2002 |
| GB | 2358999 | 8/2001 |
| WO | WO95/13597 | 5/1995 |
| WO | WO96/25005 | 8/1996 |
| WO | WO96/26494 | 8/1996 |
| WO | WO98/37641 | 8/1998 |
| WO | WO00/45545 | 8/2000 |
| WO | WO00/74371 | 12/2000 |
| WO | WO01/06755 | 1/2001 |
| WO | WO02/13138 | 2/2002 |
| WO | WO02/33650 | 4/2002 |

OTHER PUBLICATIONS

Review of John Canny's "A Computational Approach to Edge Detection," IEEE Trans. Pattern Analyses and Machine Intelligence, pp. 679-698, 1986.

Cox et al., "Secure Spread Spectrum Watermarking for Images, Audio and Video," Proc. Int. Conf. on Image Processing, Sep. 16-19, 1996, Part vol. 3, pp. 243-246.

Cox, et al., "A Review of Watermarking and the Importance of Perceptual Modeling", copy to appear in the Proc. of Electronic Imaging '97, Feb. 1997, 8 pages.

Cox, et al., "Using Perceptual Models," Chapter 7 of Digital Watermarking, 2002, pp. 201-240.

Delaigle, et al., "Watermarking Algorithm Based on a Human Visual Model", Signal Processing, Oct. 1998, 23 pages.

De Rosa et al., "Watermark Capacity Measure Incorporating a Model of the Human Visual System", Proceeding of SPIE vol. 4314, 2001, pp. 483-494.

Goffin, "A Low Cost Perceptive Digital Picture Watermarking Method," Feb. 13-14, 1997, Proc. SPIE-Int. Soc. Opt. Eng., vol. 3022, pp. 264-277.

Hernandez et al., "Statistical Analysis of Watermarking Schemes for Copyright Protection of Images", Proceedings of the IEEE, vol. 87, No. 7, Jul. 1999, pp. 1142-1166.

Holliman et al., "Adaptive Public Watermarking of DCT-Based Compressed Images," Proc. SPIE-Int. Soc. Opt. Eng., vol. 3312, pp. 284-295, 1997.

Lim, "Two-Dimensional Signal and Image Processing", PTR Prentice Hall, New Jersey, 1990 pp. 476-495.

Podilchuk et al., "Image-Adaptive Watermarking Using Visual Models," 1998, 37 pages.

Pratt, Digital Image Processing, John Wiley & Sons, New York, 1978, pp. 478-492.

Robert et al., "Masking Models and Watermark unDetection," Proceeding of SPIE, vol. 4314, 2001, pp. 455-467.

Sharma et al., "Practical Challenges for Digital Watermarking Applications," May 2001, 10 pages.

Jung, et al., "Novel Watermarking Embedding Technique Based on Human Visual system," Proceeding of SPIE vol. 4314, 2001, pp. 475-482.

Kim et al., "Texture Classification Using a Rotated Wavelet Filterbank," IEEE Transactions on System, Man, and Cybernetics, vol. 30, No. 6, pp. 847-852, 2000.

Zhou et al. "Image Representation and Retrieval Using Structure Features," Proceedings of the 15th Intl. Conference on Pattern Recognition, 2000, vol. 1, pp. 1039-1042.

International Search Report for PCT/US01/19303, mailed Dec. 31, 2001.

International Preliminary Examination Report for PCT/US01/19303, completed Dec. 12, 2002.

\* cited by examiner (Watermark Gain Algorithm Block Diagram)

(Canny Edge Mask of "Mandrill")

(Our modified Canny Edge Mask of "Mandrill")

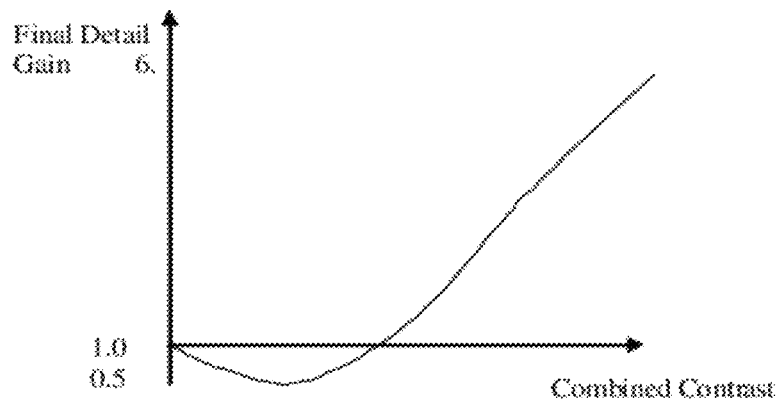
Fig. 6
(Combined Contrast to Watermark Gain Mapping Function)
 
Fig. 7a
(Watermark Gain Based on Simple Contrast, watermark accentuated for effect)
Fig. 7b
(Watermark Gain Based on Contrast with Edge Suppression, watermark accentuated for effect)

(Mandrill without Watermark)

(Mandrill with Watermark using
New Gain Algorithm)

(Image of Child without Watermark)

(Image of Child with Watermark
using New Gain Algorithm,
watermark accentuated for effect)

PERCEPTUAL MODELING OF MEDIA SIGNALS FOR DATA HIDING

RELATED APPLICATION DATA

This application is a continuation of U.S. patent application Ser. No. 12/360,549, filed Jan. 27, 2009 (now U.S. Pat. No. 7,822,226) which is a continuation of U.S. patent application Ser. No. 11/498,528, filed Aug. 2, 2006 (now U.S. Pat. No. 7,483,547), which is a continuation of U.S. patent application Ser. No. 10/684,213, filed Oct. 10, 2003 (now U.S. Pat. No. 7,088,844). The Ser. No. 10/684,213 application is a continuation of U.S. patent application Ser. No. 09/737,609, filed Dec. 13, 2000 (now U.S. Pat. No. 6,633,654; published as US 2002-0015508 A1). The Ser. No. 09/737,609 application is a continuation-in-part of U.S. patent application Ser. No. 09/596,658 (now U.S. Pat. No. 6,631,198), entitled Perceptual Modeling of Media Signals Based on Local Contrast and Directional Edges, filed on Jun. 19, 2000, by Hannigan, Reed, and Bradley. Each of the above patent documents is herein incorporated by reference.

The subject matter of the present application is related to that disclosed in U.S. Pat. No. 5,862,260, and in application Ser. No. 09/503,881, filed Feb. 14, 2000 (now U.S. Pat. No. 6,614,914); which are hereby incorporated by reference.

TECHNICAL FIELD

The technology relates to multimedia signal processing, and in particular relates to perceptual modeling of media signals, such as images, video and audio.

BACKGROUND AND SUMMARY

Perceptual modeling is often used in media signal processing applications to assess the extent to which changes to a media signal are noticeable to the human eye or ear. A perceptual model analyzes a media signal's ability to hide or mask changes. Such models are used in lossy signal compression and digital watermarking to minimize the perceptibility of these processes to a viewer or listener of the processed signal.

Lossy signal compression typically quantizes signal samples to reduce the memory or bandwidth required to store and transmit image and audio signals. Media signal codecs, like those defined in MPEG standards, use perceptual models to identify parts of media signal that can be more heavily compressed while staying within a desired quality.

Digital watermarking is a process for modifying media content to embed a machine-readable code into the data content. The data may be modified such that the embedded code is imperceptible or nearly imperceptible to the user, yet may be detected through an automated detection process. Most commonly, digital watermarking is applied to media such as images, audio signals, and video signals. However, it may also be applied to other types of data, including documents (e.g., through line, word or character shifting), software, multi-dimensional graphics models, and surface textures of objects.

Digital watermarking systems have two primary components: an embedding component that embeds the watermark in the media content, and a reading component that detects and reads the embedded watermark. The embedding component embeds a watermark signal by altering data samples of the media content. The reading component analyzes content to detect whether a watermark is present. In applications where the watermark encodes information, the reader extracts this information from the detected watermark.

In digital watermarking, one aim is to insert the maximum possible watermark signal without significantly affecting signal quality. Perceptual models may be used to determine how to embed the watermark in a host media signal such that the signal masks the watermark. In image watermarking, a watermark embedder can take advantage of the masking effect of the eye to increase the signal strength of a watermark in busy or high contrast image areas. However if this is done for all high frequency areas, a visually objectionable watermark or 'ringing' may become visible on connected directional edges.

In audio watermarking, busy or high contrast segments of an audio signal tend to have a greater masking effect. However, embedding a watermark in portions of an audio signal that represent pure tones may make the watermark more audible.

The disclosure provides methods for perceptual analysis of media signals. While particularly adapted to image signals, the disclosure applies to other types of media signals as well. One aspect of the disclosure is a method for perceptually analyzing a media signal to reduce perceptible artifacts around directional edges. The method analyzes the media signal to compute a measure of directional edges. Based at least in part on the measure of directional edges, the method computes control data used to control changes to the media signal in a manner that controls perceptibility of the changes around directional edges.

For digital watermark applications, this method may be used to reduce perceptible artifacts around connected edges. The method may also be used to reduce artifacts around directional edges in lossy signal compression schemes.

Another aspect of the disclosure is a method for perceptual analysis of a media signal based on local contrast. This method analyzes the media signal to compute measures of local contrast at samples within the media signal. Based at least in part on the measures of local contrast, it computes a measure of visual sensitivity to changes of the media signal at the samples. To compute visual sensitivity to the local contrast, it applies a human visual model that relates local contrast to visual sensitivity.

In one implementation, the human visual model performs a non-linear mapping function that is tuned to the eye's sensitivity to local contrast. In a plot of visual sensitivity versus contrast, visual sensitivity initially increases with contrast and then decreases. The mapping function exploits this attribute.

As in the case of the perceptual analysis based on directional edges, the perceptual analysis based on local contrast may be applied to a variety of media signal processing applications. Some examples include digital watermarking and lossy signal compression.

The perceptual analyses based on directional edges and local contrast may be used independently, in combination with each other, or in combination with other perceptual models.

Further features will become apparent with reference to the following detailed description and accompanying drawings.

BRIEF DESCRIPTION OF THE DRAWINGS

FIG. 6 is a graph of a combined contrast to watermark gain mapping function.

FIG. 7a is an image illustrating watermark gain based on contrast, including an embedded watermark accentuated for effect.

FIG. 7b is an image illustrating watermark gain based on contrast with edge suppression, including an embedded watermark accentuated for effect.

DETAILED DESCRIPTION

Figure 1:
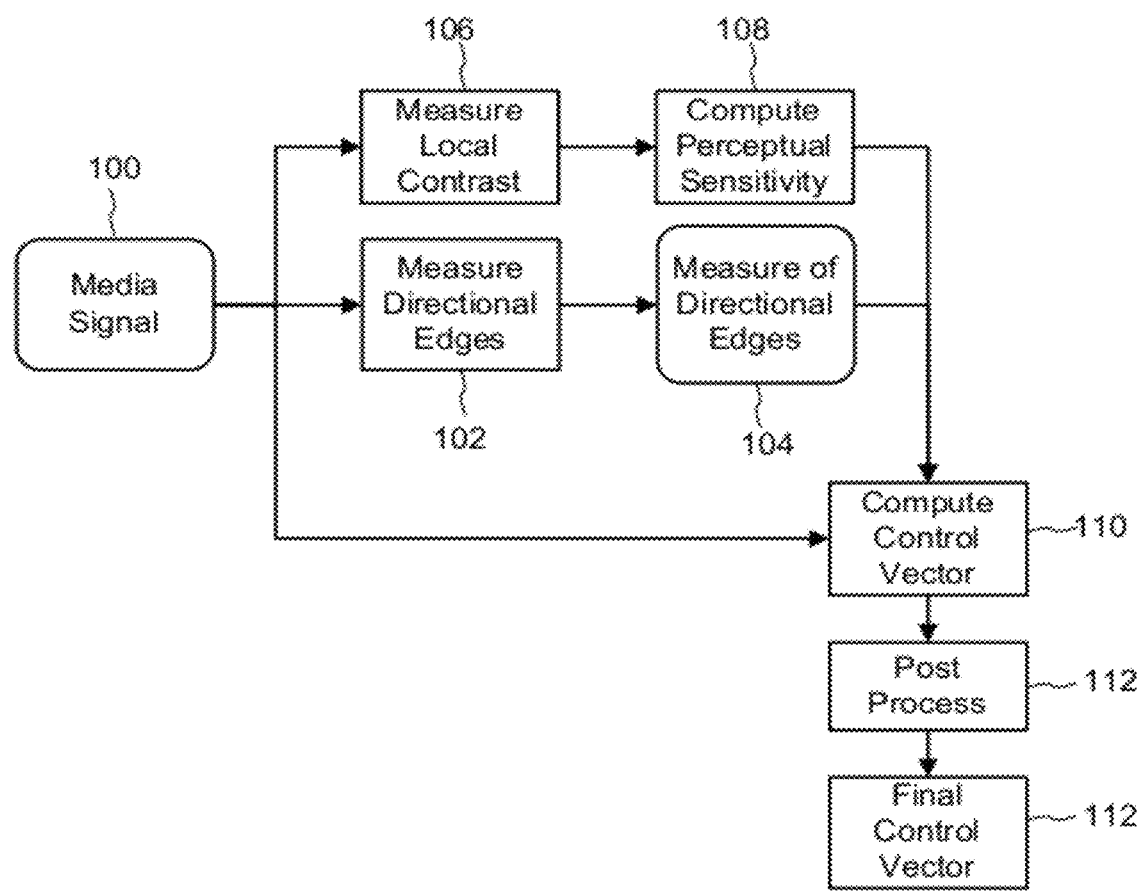
FIG. 1 is a diagram illustrating a method for perceptual modeling of a media signal.

FIG. 1 is a diagram illustrating a method for perceptual analysis of a media signal. The following discussion describes this method as applied to still image signals. However, the principals of the method are applicable to video and audio signals as well. This method includes perceptual modeling based on local contrast and directional edges. The result of this perceptual modeling may be combined with other forms of perceptual modeling. In addition, perceptual modeling based on local contrast and directional edges may be used independently.

The input to the perceptual analysis is a media signal 100, such as an image or audio signal. For the sake of an example, we describe an implementation for still images. In this case, the media signal is an image or part of an image. One aspect of the perceptual analysis 102 computes a measure of directional edges (104) at positions throughout the media signal. The method uses this measure to compute data to control changes to the input signal in a manner that reduces perceptibility of those changes. For example, the control data may be used to suppress a change to a sample or set of samples of a media signal as a function of the measure of directional edges at the position of the sample or samples in the media signal.

Another aspect of the perceptual analysis 106 computes a measure of local contrast at positions in the media signal. It then computes perceptual sensitivity at these positions based on the local contrast measurements and a perceptual model that models human sensitivity to contrast.

The perceptual analysis uses the results of the directional edge and local contrast perceptual modeling to compute a control vector (110). Elements of the control vector correspond to samples of the media signal. The magnitude of these elements reflect the relative impact that changes to corresponding samples are expected to have on perceptibility. A larger element value in the control vector means that changes to a media signal at the position of that element are less likely to be noticeable, and thus, can tolerate greater changes for a desired amount of perceptibility. A smaller element value, conversely, means that changes will have a greater impact on perceptibility.

The perceptual analysis may combine either or both of the local contrast and directional edge measurements with other perceptual analyses data to compute the control vector (110). In the example of an image signal, the perceptual analysis may also compute a measure of image activity. Parts of an image that are highly busy or textured can withstand more changes for a desired amount of perceptibility relative to less busy, smoothly varying parts.

One way to perceptually analyze such signal activity is to high pass filter parts of the signal to measure the high frequency content of each part. The amount of high frequency components in a given part of the signal means that the part is more busy and likely to withstand more changes for a desired amount of perceptibility.

Another way to analyze signal activity is to measure the edges or sharp transitions per unit of the signal. A high measure of edges over a given area tends to indicate greater signal activity, and thus, a greater tolerance for changes for a desired amount of perceptibility. The exception, as noted above, is that directional edges are more sensitive to changes. Thus, a general measure of edginess without concern for directional edges will roughly indicate the extent to which a signal is perceptually insensitive to changes. A measure of directed edges over the same part of the signal indicates the extent to which the signal has directional edges that are sensitive to changes. In a similar manner, the watermark detector should ignore areas with directional edges thus reducing the jamming effect of text and other strong directional edges.

In computing the control vector, the perceptual analysis takes into account the local contrast measure, the directional edge measure, and possibly other perceptual modeling such as models based on signal activity. Each of these perceptual analyses contributes to a composite control vector. Depending on the application, the perceptual analysis process may apply additional post processing to the composite vector to generate a final control vector 112. This final control vector 114, or intermediate control vectors from the local contrast or directional edge analyses, may then be used in a variety of applications of perceptual modeling.

One such application is the embedding of a digital watermark. For example, a control vector may be used to control the strength with which a watermark signal is embedded in the media signal. The control vector can be used to adapt the watermark to the host signal in which it is embedded. This perceptual analysis method applies broadly to watermark methods that embed a watermark by changing the host signal in a temporal or spatial domain in which the signal is perceived (viewed or heard) or by changing the host signal in a transform domain, such as modifying transform coefficients, subband samples, etc.

For example, some watermark methods transform a host signal to a transform domain, modify transform coefficients or samples, and then inverse transform the modified coefficients or samples to produce a watermarked signal. Some examples include methods that modify Discrete Cosine Transform, Discrete Wavelet Transform, or Discrete Fourier Transform coefficients. Elements of the control vector may correspond to parts of the host signal that are transformed to the selected transform domain. For example, in watermark process that encodes auxiliary information in DCT blocks, the elements of the control vector may correspond to the strength of watermark encoding in the DCT blocks. In a watermark process that encodes auxiliary information in subband samples, the elements of the control vector may correspond to subband samples or groups of subband samples.

Another such application is lossy data compression of media signals. For example, a control vector may be used to control quantization of media signal samples in lossy compression schemes for images (e.g., JPEG, JPEG 2000), video (MPEG, H263, Windows Media Video), and audio (MPEG, AAC, Qdesign, Windows Media Audio, Twin VQ, ATRAC3, Dolby Digital AC-3, ePAC). As noted above, elements of the control vector may correspond to samples of the media signal, or transform coefficients or samples.

The granularity of the control vector may vary with the application and media signal type. For image signals, elements of the control vector may correspond to a pixel or blocks of pixels at a given spatial resolution. For audio signals, the elements of the control vector may correspond to an audio sample or frame of temporally contiguous audio samples.

The control vector may also correspond to media signal samples in a transform domain. An audio signal may be transformed into a time-frequency domain and then analyzed using aspects of the perceptual model described above. For example, an analysis tool may transform overlapping, temporal frames of an audio signal into a time frequency space, where the time axis corresponds to temporal frames, and the frequency corresponds to frequency coefficients for each frame.

The control vector may be used as a gain vector with elements that are used to adjust the strength of corresponding signal samples. For example, the elements may be used to adjust the signal strength of corresponding samples or groups of samples of a watermark signal.

Figure 2:
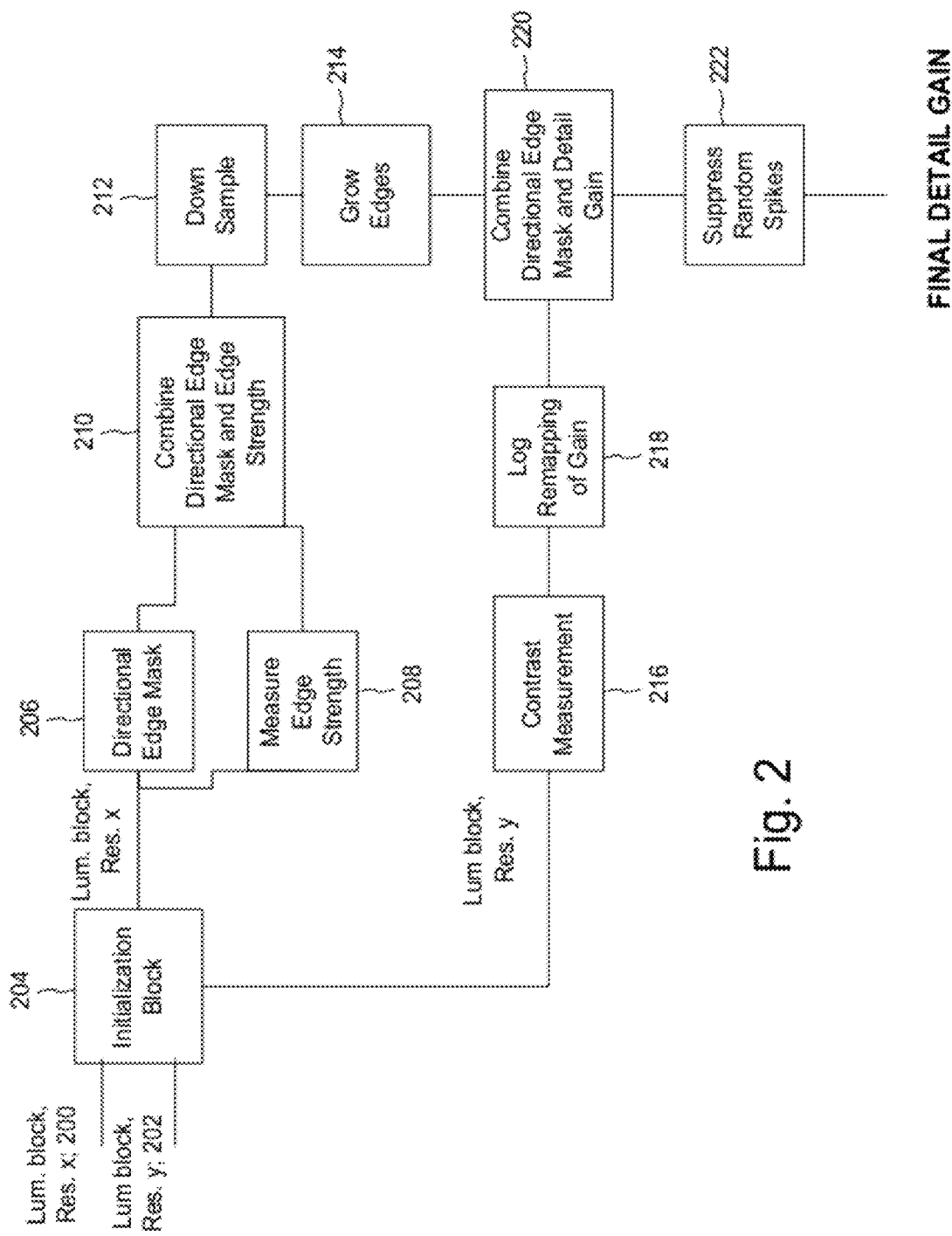
FIG. 2 is a diagram illustrating a perceptual model for image signals.

FIG. 2 is a block diagram illustrating an implementation of a perceptual analysis for image signals. The inputs to the perceptual analysis include images or image blocks. In particular, the image input includes two versions of the same image at two different resolutions 200, 202. The resolution of the image may be obtained from the header file or may be estimated from the image itself. The format of the image at this stage depends on the application. In this particular example, the perceptual analysis operates on luminance samples. The luminance samples may be generated by mapping color vector samples in an image from color space representations like RGB or CMYK to luminance values. The desired resolution of the image may be obtained by up or down-sampling the image.

An initialization process 204 sets up blocks of the image at two different resolutions. In this case, one resolution (resolution x) is double the other (resolution y). The model applies the higher resolution block to directional edge mask 206 and edge strength detector 208. The directional edge mask measures directional edges in a local neighborhood around each image sample. In particular, it computes the edge in several directions around a center sample in the neighborhood. The edge strength is calculated in four directions (horizontal, vertical, and along two diagonals), using the appropriate Gabor filters. The pixel is marked as a directional edge if the edge in one direction is significantly higher than the average of the other edge directions.

The edge strength detector 208 measures the strength of edges over the same neighborhood of image samples. One way to implement the edge strength detector is to apply a Laplacian filter to each neighborhood. The filter computes the dot product of the samples in the neighborhood with a two-dimensional array of scale factors (e.g., in a three by three window of samples, the center element has a peak value surrounded by elements of a constant, negative value such as

−1 −1 −1
−1 8 −1
−1 −1 −1

Pratt, 'Digital Image Processing', p 482, 1978).

Next, the model combines 210 corresponding elements of the edge mask and strength of edge calculations. In particular, it multiplies corresponding elements together. It then smooths the result by down sampling the resulting vector (e.g., down sample by 2) (212).

The model then applies a filter that grows directional edges 214. The effect of this filter is to retain directional edges and connect directional edges that are slightly disconnected. In effect, this process estimates the extent to which the directional edges are connected. One way to accomplish this effect is to apply an order filter over a neighborhood of samples and choose an element less than halfway deep in the ordering from large to small values (e.g., five by five window choosing element 10). At this stage, the perceptual analysis of directional edges has generated control data, and particularly, a control vector representing a measure of directional edges. This vector may then be applied to selectively suppress the strength of a watermark signal where directional edges are stronger.

Another aspect of the perceptual analysis measures local contrast, and maps the local contrast to a control data representing visual sensitivity. A local contrast analyzer 216, in this example, operates on the lower resolution version of the input image. It measures the local contrast in a neighborhood around each image sample in that image. There are many different types of filters that may be used to measure local contrast. One such example is to compute the absolute value of the difference between the center element and each of eight surrounding elements, and then average the differences.

Figure 3:
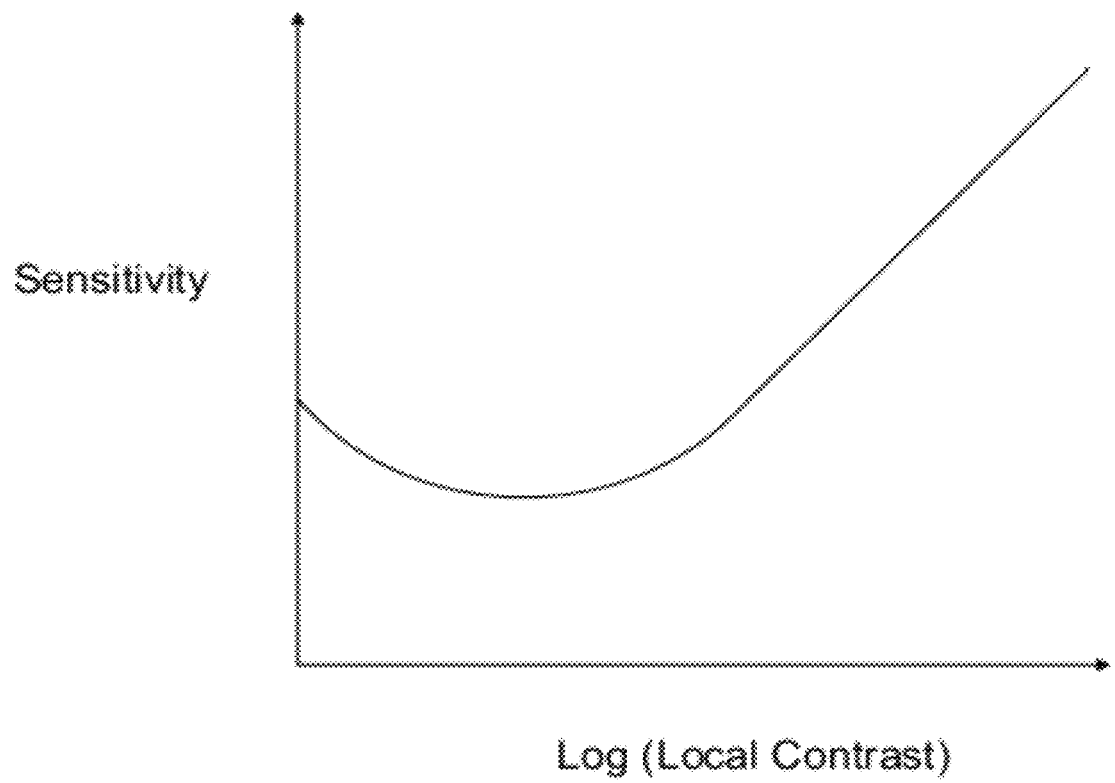
FIG. 3 is a plot depicting a non-linear mapping function used to map local contrast to human sensitivity in a human perceptual model.

Next, the perceptual analysis maps the local contrast measurements to control values based on a perceptual model 218 that simulates the eye's sensitivity to contrast. FIG. 3 illustrates a plot showing an example of the perceptual model. The perceptual model is depicted as a mapping function that maps local contrast values to a corresponding sensitivity values. These sensitivity values may act as control data, or may be converted to control data, used to adjust changes to the image.

For example, the control data for the image may comprises a control vector with elements that represent sensitivity: larger values mean low sensitivity, while smaller values mean high sensitivity. The mapping function follows the human eye's sensitivity to contrast. The vertical axis corresponds to a gain boost, meaning that larger values reflect that the image can tolerate more changes for a desired level of perceptibility. The horizontal axis is a log scale of contrast. From FIG. 3, one can see that the eye is more sensitive to small levels of contrast, than no contrast. As the contrast increases, however, the eye becomes increasingly less sensitive to changes.

The increase in signal strength in the presence of a reference signal before being visually perceptible is a non-linear function (Barten, 'Contrast Sensitivity of the Human Eye', p. 139, 1999). For watermarking applications, the mapping function has been derived experimentally, by applying a watermark signal at different strengths on top of a textured image of different contrasts. The strength at which the mark was just noticeable at each contrast was then determined visually, to generate a contrast versus watermark gain control curve.

The result of remapping the local contrast measurements is a control vector that adjusts changes to an image based on sensitivity. Elements of the vector corresponding to less sensitive image areas increase the change, while elements of the vector corresponding to more sensitive areas decrease the change.

The perceptual analysis combines 220 the control vector from the contrast and directional edge modeling to form a gain vector. Additional post processing 222 may then be applied to the gain vector. In the example shown in FIG. 2, the model applies a filter 224 that removes isolated directional edges. To accomplish this, the perceptual analysis depicted in FIG. 2 uses a filter that suppresses random spikes in the gain vector. One such filter is a generalized order filter. One implementation of this type of filter orders elements from large to small values in a window around each element of the gain vector and replaces the center element with an element near the top (e.g., in a ordering of elements in a five by five window, choosing element 4).

For optimal performance for particular applications, the model can be tuned by selecting combinations of filters that compliment each other and fine tuning the parameters of each filter.

The components of the perceptual analysis shown in FIG. 2 may vary from one implementation to another. Experiments indicate that a similar implementation to the one shown in FIG. 2, without the direction edge filter 214, may provide better results. In some implementations, the re-mapping function applied to local contrast may not be a log mapping, but instead, some other non-linear mapping. Processes such as the just noticeable difference tests described above may be used to experimentally derive the non-linear mapping function for a particular application and type of media signal.

The perceptual analysis performs a contrast measurement and a directional edge measurement. In one implementation, it combines the two measurements and re-maps the result to take into account the human's perception of contrast. In an alternative implementation, the re-mapping may be applied to the contrast measurement, without a directional edge measurement.

Modified Implementation

This section describes a modified implementation of the method shown in FIG. 2. This method for determining the magnitude of watermark signal to be applied based on local image characteristics can be described in four conceptual stages: directional edge detection, local contrast measurement and correction, combination of edge detection and contrast, and non-linear contrast to gain mapping.

In this implementation, host image sample data is first fed into two separate stages—the contrast measurement stage and the directional edge detector stage. The results from these two stages are then combined to form a "corrected contrast measurement map" which reports the local contrast values for the image while protecting directional edges. The results from this stage are then passed into a non-linear contrast to gain mapping stage which calculates the gain values, or magnitude of watermark signal varied image regions should receive.

Contrast Measurement

If a watermark is applied at equal strength throughout an image it will tend to be more visible in texturally flat regions, and less visible in busier areas. Conversely, it is usually more difficult to extract the watermark from pixels in busy regions than in those that are texturally flat. For these two reasons it is in general desirable to measure the textural contrast of the image to be watermarked on a local basis. The obtained measurement is then used to control the strength of the watermark applied to the measured region. The process would be repeated for all regions of the image that require a watermark.

The measurement of contrast typically involves one or more filtering operations, possibly non-linear. To make an initial measurement of contrast, this implementation uses a band pass filtering operation. Although straightforward filtering produces a good initial result, refinement is used before the textural contrast measurement can be mapped to watermark strength without undue ill effects.

Using filtering to determine textural contrast, and hence watermark strength, without taking into account certain natural image characteristics leads to apocryphal indicators of how heavily a watermark should be applied to a given region. A region that contains a sudden transition in luminance may be labeled as a prime candidate for high watermark strength after initial contrast filtering. Regions that contain borders, text, or fine lines are some examples. If the region is heavy-handedly doused with a watermark it may appear objectionable depending upon the characteristics of the region and others that surround it. We classify as false contrast regions those that cannot truly support high watermark strength when the filter-based contrast measurement would indicate otherwise.

One method of dealing with potentially false contrast regions is to de-emphasize, or even penalize, such regions if they have an uncharacteristically high contrast. For example, we have been able to characterize our contrast filter by applying it to images we would regard as busy; the image does not degrade noticeably under high watermark strength. We found that on average the contrast measurement is relatively low compared with many of the false contrast regions. By characterizing our filter we set a peak expected contrast. If a region's contrast supersedes the expected peak contrast, its final assigned contrast is clipped at the expected peak value, or in some case reduced below the peak value. Although beneficial, the described contrast adjustment procedure works only on a local image region basis. By taking into account groups of regions, more intelligent decisions can be made regarding the application of watermark strength. Our so-called directional edge finding method serves to do just that.

Connected Edge Detection

Edge detection algorithms have been well studied and evaluated in image processing literature. See J. S. Lim, Two-Dimensional Signal and Image Processing, pp. 476-495, PTR Prentice Hall, New Jersey, 1990; and W. K. Pratt, Digital Image Processing, pp. 478-492, John Wiley & Sons, New York, 1978. Typical edge detection processes define an edge as a "step discontinuity in the image signal", and attempt to locate edges by convolving the image with a kernel that approximates a first or second derivative. See, for example, P. Kovesi, "Lecture 6, Classical Feature Detection," http://www.cs.uwa.edu.au/undergraduate/courses/233.412/Lectures/Lecture6/lecture6.html, The University of Western Australia, 2000.

Using a first derivative kernel, an edge occurs at local maxima, while for second derivatives, edges occur at the zero crossings. John F. Canny developed a standard in edge detection. See, J. F. Canny, "A computational approach to edge detection," IEEE Trans. Pattern Analysis and Machine Intelligence, 8, pp. 679-698, 1986. This edge detection method starts by convolving an image with a 2-D Gaussian filter, and then differentiating this smoothed image in two orthogonal directions. By calculating the derivative in two orthogonal directions, one can determine the overall gradient direction and amplitude. Using this knowledge, the implementation then suppresses points which were non-maxima and values that were not local peaks. The final step involves thresholding the edges. Two threshold values are used. The first threshold, which is larger than the second, identifies most of the true edges. However, some discontinuities in edges may occur using this higher value, so pixels which are connected to these high threshold edges are also considered edges if they are above the second, smaller threshold. The resulting map typically provides a very good representation of the edges in the image.

The edge map provided by the Canny edge detection algorithm does not attempt to differentiate between connected edges and areas with a high concentration of random edge like textures. For example, for an images with random edge like textures like images of hair or fur, a Canny edge algorithm might construct the edge map in which the image portions depicting hair or fur are said to contain a high concentration of edges. However, the purpose of the edge map in our approach is to highlight connected edges that we should avoid when increasing watermark signal gain. The fur area should be able to hold a good deal of watermark signal, since the so-called edges are really a somewhat random texture, and placing a noise like signal in this texture is unlikely to be noticed. Thus, we modify Canny's edge detection algorithm to ignore random, closely packed edges in the following fashion. First, we take the edge map provided by Canny's algorithm and smear it with a 5×5 or 7×7 low pass filter kernel. This causes closely packed edges to bleed into one another. Next, we thin this smeared edge map using a min filter of a slightly higher order than the smear. This causes edges which were stretched to contract back in tighter than the original Canny edge mask. A composite, binary edge mask is then constructed by saying a pixel is on an edge if and only if the original Canny edge mask says it is an edge, but the min-filtered, smeared Canny Edge mask says it is not. This operation essentially allows edges that are boundary edges to remain, while closely packed edges disappear. The final step grows the edge map by a suitable radius to protect all pixels which may inadvertently be called "high contrast" areas due to these edges.

Combination of Edge Detection and Contrast Measurement

The third stage of our algorithm combines the results of the edge detection and contrast measurement stages. As stated above, the general method in determining the amount of watermark gain a certain image area should receive is mapping local contrast to some gain value. The purpose of the edge detection section is to identify areas which may be perceived as high contrast areas by the contrast algorithm, but in reality can not hold the watermark gain generally associated with such a high contrast. Examples of these regions are text edges, object boundaries, and other directional edges.

This combination stage therefore takes as input the contrast map of the image as well as the binary edge map. For any contrast value which is not said to be on an edge, the contrast value is untouched. For those contrast values which are found to be on a directional edge however, the reported contrast value is calculated as a percentage of the original. We have found experimentally that a contrast reduction of 50% to 80% on edges provides a clean gain map with edges free of objectionable watermark ringing.

Non-Linear Contrast to Gain Mapping

The combined detail gain contrast calculation is then passed through a one-dimensional mapping function to obtain a final detail gain.

The detail gain function has a dip at low contrast, and is then approximately linear on a log scale. The function was calibrated for our application by using a mid-gray patch with white noise of various contrast levels, and embedding at different strengths until the watermark is just perceptually visible in order to build up the curve shape. Further tests were then performed on a standard image set. The shape obtained was very similar to the generalized contrast discrimination model reported in Peter G. J. Bartens, 'Contrast Sensitivity of the Human Eye and Its Effects on Image Quality', p. 147-151, SPIE Press, 1999.

The model shows that the peak sensitivity of the human visual system to a signal, in the presence of a reference signal, is at a low contrast of about 0.9% modulation of the reference signal.

The resulting detailed gain values are used to control the strength of the watermark signal embedded in image samples or groups of samples at corresponding locations in an image signal. In particular, the gain values are used to scale the amplitude or energy of the watermark signal at corresponding image sample locations in a host image. For more information, see Hannigan, B. Reed, A. and Bradley, B., Digital Watermarking Using Improved Human Visual System Model, which is attached as Appendix A and incorporated by reference.

APPENDIX A

Digital Watermarking Using Improved Human Visual System Model

Brett T. Hannigan, Alastair Reed, Brett Bradley

Digimarc Corporation, 19801 SW $72^{nd}$ Ave., Suite 250, Tualatin, Oreg. 97062

Abstract

In digital watermarking, one aim is to insert the maximum possible watermark signal without significantly affecting image quality. Advantage can be taken of the masking effect of the eye to increase the signal strength in busy or high contrast image areas. The application of such a human visual system model to watermarking has been proposed by several authors. However if a simple contrast measurement is used, an objectionable ringing effect may become visible on connected directional edges.

In this paper we describe a method which distinguishes between connected directional edges and high frequency textured areas, which have no preferred edge direction. The watermark gain on connected directional edges is suppressed, while the gain in high contrast textures is increased. Overall, such a procedure accommodates a more robust watermark for the same level of visual degradation because the watermark is attenuated where it is truly objectionable, and enhanced where it is not.

Furthermore, some authors propose that the magnitude of a signal which can be imperceptibly placed in the presence of a reference signal can be described by a non-linear mapping of magnitude to local contrast. In this paper we derive a mapping function experimentally by determining the point of just noticeable difference between a reference image and a reference image with watermark.

Keywords: Digital watermarking, Edge Detection, Connected Edges, Human Visual System, Digimarc 1. Introduction The process of digital watermarking involves tweaking pixel values at various regions within an image to encode some piece of information. This encoded information can be used to provide copyright information, to prevent illegal duplication, or even as a dynamic link between the image and online digital data. For most applications, the image owner would like to make the encoded data robust enough to ensure its detection while maintaining the high quality of the original image. Often times these two desires are in direct conflict with each other—any increase in robustness comes at the expense of increased signal visibility. However, the visual impact a signal has on a particular image is not solely related to the magnitude of the signal, nor is the detectability of a signal solely related to its magnitude. Local image characteristics also help determine the visibility of a signal and its detectability. For instance, a signal embedded into an image area which is primarily flat will be more visible than a signal of equal magnitude embedded into an area of high contrast. This latter signal may be more difficult to detect however, as areas of higher contrast can interfere or jam a signal more easily than a flat area.

Many watermarking schemes attempt to analyze images in order to identify how much watermark signal various image areas can hold while maintaining equal visibility. A related methodology attempts to identify how much watermark signal various image areas require to maintain equal detectability across the entire image. These techniques often accomplish this by calculating a value of local contrast, and mapping increasing contrast values to increasing signal magnitudes [1],[2]. This can present a problem though, as directional edges separating two distinct objects in an image may be identified as high contrast areas. This results in the application of a higher strength watermark signal around the connected edge, which causes an objectionable watermark ringing or halo.

In this paper, we introduce a method which better identifies areas of true high contrast texture while protecting connected directional edges. Additionally, we describe a more accurate mapping to be used when mapping local contrast to watermark gain. We then discuss results of utilizing the new algorithm, and compare those results to a previous method. We conclude by discussing possible extensions to this method for the future.

2. Algorithm Description

Figure 4:
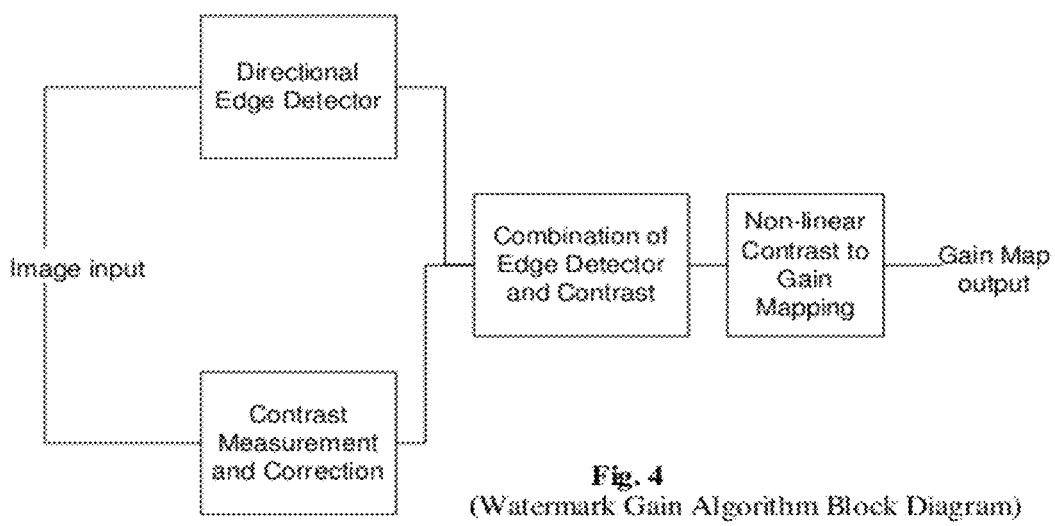
FIG. 4 is a block diagram showing an algorithm for determining the magnitude of watermark gain to be applied based on local image characteristics.

Our algorithm for determining the magnitude of watermark signal to be applied based on local image characteristics can be described in four conceptual stages, as shown in FIG. 4.

The image data is first fed into two separate stages—the contrast measurement stage and the directional edge detector stage. The results from these two stages are then combined to form a "corrected contrast measurement map" which reports the local contrast values for the image while protecting directional edges. The results from this stage are then passed into a non-linear contrast to gain mapping stage which calculates the gain values, or magnitude of watermark signal varied image regions should receive.

Contrast Measurement

If a watermark is applied at equal strength throughout an image it will tend to be more visible in texturally flat regions, and less visible in busier areas. Conversely, it is usually more difficult to extract the watermark from pixels in busy regions than in those that are texturally flat. For these two reasons it is in general desirable to measure the textural contrast of the image to be watermarked on a local basis. The obtained measurement is then used to control the strength of the watermark applied to the measured region. The process would be repeated for all regions of the image that require a watermark.

The measurement of contrast typically involves one or more filtering operations, possibly non-linear. To make an initial measurement of contrast, our implementation uses a band pass filtering operation. Although straightforward filtering produces a good initial result, refinement is required before the textural contrast measurement can be mapped to watermark strength without undue ill effects.

Using filtering to determine textural contrast, and hence watermark strength, without taking into account certain natural image characteristics leads to apocryphal indicators of how heavily a watermark should be applied to a given region. A region that contains a sudden transition in luminance may be labeled as a prime candidate for high watermark strength after initial contrast filtering. Regions that contain borders, text, or fine lines are some examples. If the region is heavy-handedly doused with a watermark it may appear objectionable depending upon the characteristics of the region and others that surround it. We classify as false contrast regions those that cannot truly support high watermark strength when the filter-based contrast measurement would indicate otherwise.

One method of dealing with potentially false contrast regions is to de-emphasize, or even penalize, such regions if they have an uncharacteristically high contrast. For example, we have been able to characterize our contrast filter by applying it to images we would regard as busy; the image does not degrade noticeably under high watermark strength. We found that on average the contrast measurement is relatively low compared with many of the false contrast regions. By characterizing our filter we set a peak expected contrast. If a region's contrast supersedes the expected peak contrast, its final assigned contrast is clipped at the expected peak value, or in some case reduced below the peak value. Although beneficial, the described contrast adjustment procedure works only on a local image region basis. By taking into account groups of regions, more intelligent decisions can be made regarding the application of watermark strength. Our so-called directional edge finding method serves to do just that.

Connected Edge Detection

Edge detection algorithms have been evaluated in image processing literature [3],[4]. Typical edge detection processes define an edge as a "step discontinuity in the image signal" [5], and attempt to locate edges by convolving the image with a kernel that approximates a first or second derivative. Using a first derivative kernel, an edge occurs at local maxima, while for second derivatives, edges occur at the zero crossings. John F. Canny developed the current standard in edge detection [6]. His method starts by convolving an image with a 2-D Gaussian filter, and then differentiating this smoothed image in two orthogonal directions. By calculating the derivative in two orthogonal directions, one can determine the overall gradient direction and amplitude. Using this knowledge, the algorithm then suppresses points which were non-maxima and values that were not local peaks. The final step involves thresholding the edges. Two threshold values are used . The first threshold, which is larger than the second, identifies most of the true edges. However, some discontinuities in edges may occur using this higher value, so pixels which are connected to these high threshold edges are also considered edges if they are above the second, smaller threshold. The resulting map typically provides a very good representation of the edges in the image.

Figure 5A:
FIG. 5a illustrates a Canny edge mask of the "Mandrill" image.
Figure 5B:
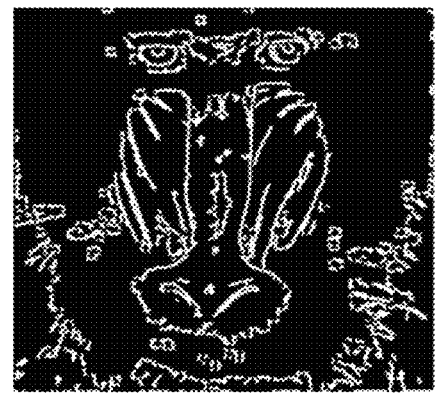
FIG. 5b illustrates a modified Canny edge mask of the "Mandrill" image.

The edge map provided by the Canny edge detection algorithm does not attempt to differentiate between connected edges and areas with a high concentration of random edge like textures. For example, for an image like "Mandrill", a Canny edge algorithm might construct the edge map in FIG. 5a, in which the fur around the mandrill's nose is said to contain a high concentration of edges. However, the purpose of the edge map in our algorithm is to highlight connected edges we should avoid when increasing watermark signal gain. The fur area should be able to hold a good deal of watermark signal, since the so-called edges are really a somewhat random texture, and placing a noise like signal in this texture is unlikely to be noticed. Thus, we modify Canny's edge detection algorithm to ignore random, closely packed edges in the following fashion. First, we take the edge map provided by Canny's algorithm and smear it with a 5×5 or 7×7 low pass filter kernel. This causes closely packed edges to bleed into one another. Next, we thin this smeared edge map using a min filter of a slightly higher order than the smear. This causes edges which were stretched to contract back in tighter than the original Canny edge mask. A composite, binary edge mask is then constructed by saying a pixel is on an edge if and only if the original Canny edge mask says it is an edge, but the min-filtered, smeared Canny Edge mask says it is not. This operation essentially allows edges that are boundary edges to remain, while closely packed edges disappear. The final step grows the edge map by a suitable radius to protect all pixels which may inadvertently be called "high contrast" areas due to these edges. The effect of this process on "Mandrill", as can be seen in FIG. 5b, is to keep the edges around the mandrill's eyes, nose, and outer face, while disregarding the texture edges on his fur.

2.3 Combination of Edge Detection and Contrast Measurement

The third stage of our algorithm combines the results of the edge detection and contrast measurement stages. As stated above, the general method in determining the amount of watermark gain a certain image area should receive is mapping local contrast to some gain value. The purpose of the edge detection section is to identify areas which may be perceived as high contrast areas by the contrast algorithm, but in reality can not hold the watermark gain generally associated with such a high contrast. Examples of these regions are text edges, object boundaries, and other directional edges.

This combination stage therefore takes as input the contrast map of the image as well as the binary edge map. For any contrast value which is not said to be on an edge, the contrast value is untouched. For those contrast values which are found to be on a directional edge however, the reported contrast value is calculated as a percentage of the original. We have found experimentally that a contrast reduction of 50% to 80% on edges provides a clean gain map with edges free of objectionable watermark ringing.

2.4 Non-Linear Contrast to Gain Mapping

The combined detail gain contrast calculation is then passed through a one-dimensional mapping function shown below in FIG. 6 to obtain a final detail gain.

FIG. 6. Combined Contrast to Watermark Gain Mapping Function

The detail gain mapping function has a dip at low contrast, and is then approximately linear on a log scale. The function was calibrated for our application by using a mid-gray patch with white noise of various contrast levels, and embedding at different strengths until the watermark is just perceptually visible in order to build up the curve shape. Further tests were then performed on a standard image set. The shape obtained was very similar to the generalized contrast discrimination model reported in [7]. The model shows that the peak sensitivity of the human visual system to a signal, in the presence of a reference signal, is at a low contrast of about 0.9% modulation of the reference signal.

3. Results

Comparison of Two Watermark Gain Methods

In FIG. 7a, watermark gain was simply varied depending on local image contrast For some connected edges, as in the road sign, this resulted in a visually objectionable watermark that appeared as a ringing on connected edges. The proposed watermark gain with edge suppression method, identifies these areas as connected edges, and suppresses the watermark signal in these regions. The result shown in FIG. 7b, is an image with much cleaner text edges, since the objectionable ringing on connected edges has been suppressed.

The non-linear curve that is used to apply the watermark gain based on contrast takes advantage of the masking effect of the human eye, allowing a higher strength signal to be put into high contrast areas. This could not be done in the past due to the objectionable ringing of the watermark on connected edges. Since the watermark gain is suppressed on connected edges where the visibility is most objectionable, the gain can be increased to a higher level in other busy areas that are able to support a high watermark signal without visibility problems. Thus a reduction in overall watermark visibility is obtained at about the same detection rate.

The detection rate is not greatly affected by the watermark suppression on connected edges, since a very small fraction of the overall number of pixels in the image are reduced in strength. Also, in many watermarking schemes edge regions are much more difficult to read in general. Thus the overall detection rate is not greatly affected by the watermark suppression on connected edges.

Figure 8A:
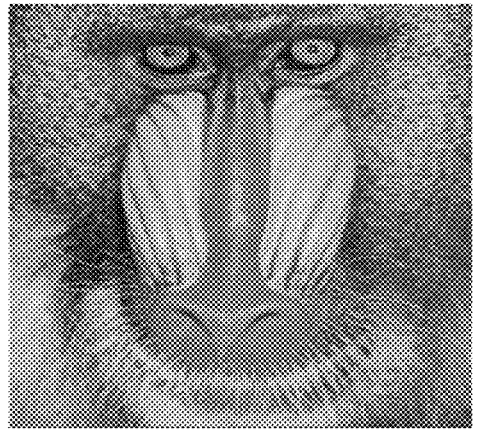
FIG. 8a is the "Mandrill" image without a watermark.
Figure 8B:
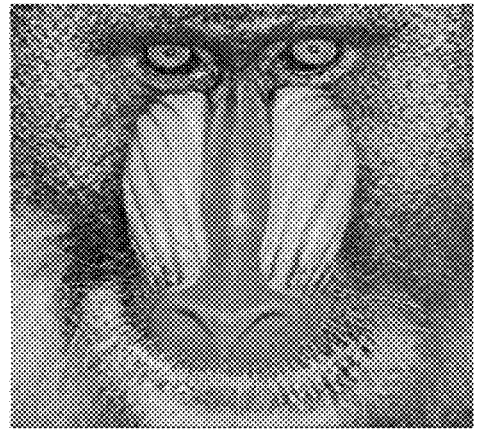
FIG. 8b is the "Mandrill" image with a watermark embedded with a gain algorithm.

FIG. 8a shows the standard mandrill image. FIG. 8b shows the image after a watermark has been applied using the new gain algorithm. A strong watermark signal has been applied without any significant visual problems being apparent around connected edges. Instead, most of the watermark is placed inside the mandrill's fur, an area of true high contrast.

3.2 Algorithm Limitations

Figure 9A:
FIG. 9a is an image of a child without a watermark.
Figure 9B:
FIG. 9b is the image of the child including a watermark embedded with the gain algorithm, with the watermark accentuated for effect.

While the algorithm developed in this paper succeeds in protecting most connected edges and false-high-contrast areas from receiving too much watermark gain, it does have some limitations. Due to the nature of the modified Canny edge detection algorithm, areas with narrow, parallel lines will still be considered true-high-contrast areas. This will cause image areas such as the girl's hair in the image labeled FIG. 9b to receive a large watermark gain, which appears visually objectionable. Additionally, small, closely spaced text may still have areas which receive too much watermark gain, although not nearly as much as in a simple contrast method. This is due to the fact that in the modified Canny edge detection algorithm, the smeared Canny edge map may smear text together, and the min filter will not shrink this area back inside the original text boundaries. This would leave some edges of the text with uncorrected high-contrast values.

4. Extensions And Conclusion

The algorithm developed in this paper successfully uses a local contrast value to determine the watermark gain, while additionally suppressing gain at most false-high-contrast areas. In certain instances, the algorithm mistakenly allows a large watermark gain in an area that is unable to imperceptibly hold it. Future versions of the algorithm should therefore work to better differentiate between random, high contrast texture, and more uniform, parallel line patterns, as well as closely spaced text.

Acknowledgements

The authors would like to thank Tony Rodriguez, Don Haaga, Lou Berkley, Eric Hudson, Steve Whaley, Matt Riley, Peter Harmon, Ben Bounketh, David Cushman, Brian MacIntosh, Steve Decker, Burt Perry, Geoff Rhoads and Joel Meyer of Digimarc for their help in contributions to this paper.

REFERENCES

1. C. I. Podilchuk, W. Zeng, "Image-adaptive watermarking using visual models," 1998.
2. J. F. Delaigle, C. De Vleeschowuwer, B. Macq, "Watermarking algorithm based on a human visual model," *Signal Processing*. 66, pp. 319-335, 1998.
3. J. S. Lim, *Two-Dimensional Signal and Image Processing*, pp. 476-495, PTR Prentice Hall, New Jersey, 1990.
4. W. K. Pratt, *Digital Image Processing*, pp. 478-492, John Wiley & Sons, New York, 1978.

5. P. Kovesi, "Lecture 6, Classical Feature Detection," http://www.cs.uwa.edu.au/undergraduate/courses/233.412/Lectures/Lecture6/lecture6.html, The University of Western Australia, 2000.
6. J. F. Canny, "A computational approach to edge detection," *IEEE Trans. Pattern Analysis and Machine Intelligence*, 8, pp. 679-698, 1986.
7. Peter G. J. Bartens, 'Contrast Sensitivity of the Human Eye and Its Effects on Image Quality', p.147-151, SPIE Press, 1999

Concluding Remarks

Having described and illustrated the principles of the technology with reference to specific implementations, it will be recognized that the technology can be implemented in many other, different, forms. To provide a comprehensive disclosure without unduly lengthening the specification, applicants incorporate by reference the patents and patent applications referenced above. Processes and components described in these applications may be used in various combinations with processes and components described above.

The methods and processes described above may be implemented in hardware, software or a combination of hardware and software. For example, the process may be incorporated into a watermark or media signal encoding system implemented in a computer or computer network. The methods and processes described above may be implemented in programs executed from the system's memory (a computer readable medium, such as an electronic, optical or magnetic storage device.)

The particular combinations of elements and features in the above-detailed embodiments are exemplary only; the interchanging and substitution of these teachings with other teachings in this and the incorporated-by-reference patents/applications are also contemplated.

What is claimed is:

1. A method comprising:
using a programmed processor:
determining characteristics of a media signal including characteristics pertaining to perceptual sensitivity;
computing a control signal using the characteristics of the media signal, the control signal corresponding to portions or features of the media signal; and
using the programmed processor, embedding a plural-bit message in the media signal according to the control signal.

2. The method of claim 1, wherein the characteristics of the media signal further comprise directional characteristics of the media signal.

3. The method of claim 1, wherein the characteristics pertaining to sensitivity comprise a contrast measurement.

4. The method of claim 1, wherein determining characteristics of a media signal determines characteristics in terms of luminance.

5. The method of claim 1, wherein embedding utilizes digital watermarking, wherein data representing the media signal is altered through the digital watermarking to convey the plural-bit message.

6. A method comprising:
receiving data representing a media signal;
using a programmed processor, calculating perceptibility characteristics of the media signal, wherein the perceptibility characteristics include contrast;
using the programmed processor, calculating a non-linear contrast to gain mapping using the perceptibility characteristics; and
using the programmed processor, embedding an auxiliary signal in the media signal with reference to the non-linear contrast to gain mapping.

7. The method of claim 6, wherein the perceptibility characteristics further comprise a measure of directional edges.

8. The method of claim 6, wherein embedding utilizes digital watermarking, wherein data representing the media signal is altered through the digital watermarking to convey the auxiliary message.

9. The method of claim 6 wherein the contrast comprises local contrast of the media signal.

10. The method of claim 6, further comprising filtering the perceptible characteristics.

11. A non-transitory computer-readable medium comprising instructions stored thereon to cause an processor to perform operations comprising:
receiving data representing a media signal;
calculating perceptibility characteristics of the media signal, wherein the perceptibility characteristics include contrast;
calculating a non-linear contrast to gain mapping using the perceptibility characteristics; and
embedding an auxiliary signal in the media signal with reference to the non-linear contrast to gain mapping.

12. An apparatus comprising:
electronic memory configured to store a media signal;
a processor configured to:
determine characteristics of a media signal including characteristics pertaining to perceptual sensitivity;
compute a control signal using the characteristics of the media signal, the control signal corresponding to portions or features of the media signal; and
embed a plural-bit message in the media signal according to the control signal.

13. The apparatus of claim 12, wherein characteristics of the media signal further comprise directional characteristics of the media signal.

14. The apparatus of claim 12, wherein the characteristics pertaining to sensitivity comprise a contrast measurement.

15. The apparatus of claim 12, wherein the determining characteristics of a media signal determines characteristics in terms of luminance.

16. The apparatus of claim 12, wherein embedding utilizes digital watermarking, wherein data representing the media signal is altered through the digital watermarking to convey the plural-bit message.

17. An apparatus comprising:
memory configured to store data representing a media signal;
a processor configured to:
calculate perceptibility characteristics of the media signal, wherein the perceptibility characteristics include contrast;
calculate a non-linear contrast to gain mapping using the perceptibility characteristics; and
embed an auxiliary signal in the data representing the media signal with reference to the non-linear contrast to gain mapping.

18. The apparatus of claim 17, wherein the perceptibility characteristics further comprise a measure of directional edges.

19. The method of claim 17, wherein embedding utilizes digital watermarking, wherein the data representing the media signal is altered through the digital watermarking to convey the auxiliary message.

20. The apparatus of claim 17, wherein the contrast comprises local contrast.

21. The apparatus of claim 17, wherein the processor is configured to filter the perceptible characteristics.

* * * * *

UNITED STATES PATENT AND TRADEMARK OFFICE
CERTIFICATE OF CORRECTION

| | | |
|---|---|---|
| PATENT NO. | : 8,213,674 B2 | |
| APPLICATION NO. | : 12/912471 | |
| DATED | : July 3, 2012 | |
| INVENTOR(S) | : Hannigan et al. | |

It is certified that error appears in the above-identified patent and that said Letters Patent is hereby corrected as shown below:

On Page 2, item (56), under "OTHER PUBLICATIONS", in Column 2, Line 7, delete "Cox, et al.," and insert -- Cox et al., --, therefor.

On Page 2, item (56), under "OTHER PUBLICATIONS", in Column 2, Line 10, delete "Cox, et al.," and insert -- Cox et al., --, therefor.

On Page 2, item (56), under "OTHER PUBLICATIONS", in Column 2, Line 12, delete "Delaigle, et al.," and insert -- Delaigle et al., --, therefor.

On Page 3, item (56), under "OTHER PUBLICATIONS", in Column 1, Line 3, delete "Jung, et al.," and insert -- Jung et al., --, therefor.

On Page 3, item (56), under "OTHER PUBLICATIONS", in Column 2, Line 1, delete "Zhou et al." and insert -- Zhou et al., --, therefor.

In Column 5, Line 62, delete "–1 8–1" and insert -- –1–8–1 --, therefor.

In Column 7, Line 10, delete "compliment" and insert -- complement --, therefor.

In Column 9, Line 1, delete "an images" and insert -- the images --, therefor.

In Column 12, Line 44, delete "used ." and insert -- used. --, therefor.

In Column 14, Line 63, delete "Processing." and insert -- Processing, --, therefor.

In Column 15, Line 9, delete "1999" and insert -- 1999. --, therefor.

In Column 16, Line 7, in Claim 9, delete "claim 6" and insert -- claim 6, --, therefor.

In Column 16, Line 12, in Claim 11, delete "an processor" and insert -- an electronic processor --, therefor.

Signed and Sealed this
Twenty-second Day of January, 2013

David J. Kappos
*Director of the United States Patent and Trademark Office*